United States Patent [19]

Blyler, Jr. et al.

[11] Patent Number: 5,346,655
[45] Date of Patent: Sep. 13, 1994

[54] METHOD OF THERMOFORMING AN OPTICAL FIBER END

[75] Inventors: Lee L. Blyler, Jr., Basking Ridge, N.J.; Gary J. Grimes, Thornton; Lawrence J. Haas, Broomfield, both of Colo.

[73] Assignee: AT&T Bell Laboratories, Murray Hill, N.J.

[21] Appl. No.: 97,304

[22] Filed: Jul. 26, 1993

Related U.S. Application Data

[60] Continuation of Ser. No. 788,062, Nov. 5, 1991, abandoned, which is a division of Ser. No. 590,974, Oct. 1, 1990, Pat. No. 5,153,932.

[51] Int. Cl.$^5$ .................... B29C 51/18; B29D 11/00
[52] U.S. Cl. .................... 264/1.28; 264/2.7; 264/296; 264/322; 264/325; 264/DIG. 65; 264/DIG. 66; 385/121; 425/392; 425/DIG. 41
[58] Field of Search .............. 264/1.5, 293, 296, 322, 264/320, 319, 325, 2.7, DIG. 65, DIG. 66; 65/3.11, 4.2, 4.21; 385/123, 124, 146, 15, 147, 121; 425/392, DIG. 41

[56] References Cited

U.S. PATENT DOCUMENTS

| | | | |
|---|---|---|---|
| 3,625,669 | 6/1969 | Norton | 65/4.21 |
| 3,626,040 | 12/1971 | Nagao | 264/1.5 |
| 3,679,384 | 7/1972 | Colson et al. | 65/4.21 |
| 4,552,431 | 11/1985 | Allemand et al. | 65/3.11 |
| 4,564,263 | 1/1986 | Ueba et al. | 264/1.5 |
| 4,568,146 | 2/1986 | Ueba et al. | 264/1.5 |
| 4,681,400 | 7/1987 | Ueba et al. | 264/1.5 |
| 4,758,064 | 7/1988 | Neefe | 264/1.5 |
| 4,952,022 | 8/1990 | Genovese | 65/4.2 |

*Primary Examiner*—Mathieu Vargot
*Attorney, Agent, or Firm*—John C. Moran

[57] ABSTRACT

An optical coupler using round optical fibers whose ends have been formed into a predefined shape to allow greater physical packing densities in order to achieve greater uniform illumination efficiency. The interstitial space between optical fibers is greatly reduced by thermoforming the ends of round optical fibers in a mold that makes a gradual transition from a circular shape to the predefined shape to avoid optical loss. Since the change in shape is gradual, the total cross-sectional area of the fibers remains constant; and optical loss is minimal because there is no reduction in mode volume. The predefined shape may be substantially square or rectangular. The core and cladding materials of the optical fiber are carefully chosen with respect to the glass transition state temperatures of both materials because the temperature at which the materials are formed by a mold are slightly above the glass transition state of the core or cladding, whichever is higher.

5 Claims, 5 Drawing Sheets

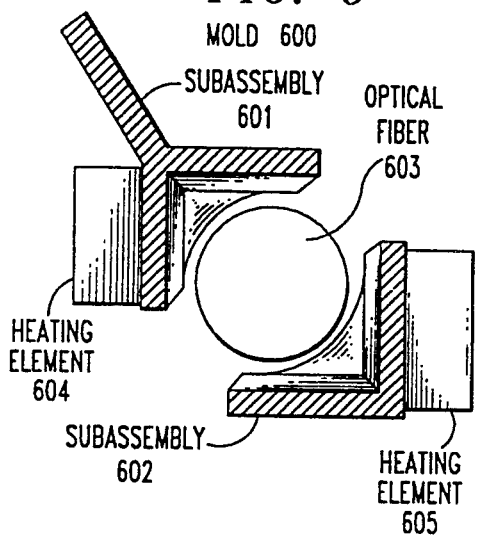
FIG. 6
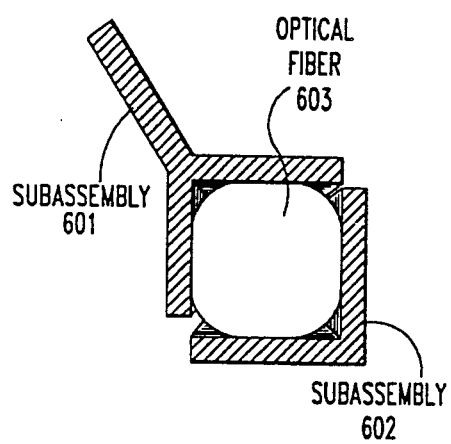
FIG. 7
FIG. 8 TOP VIEW OF SUBASSEMBLY 602
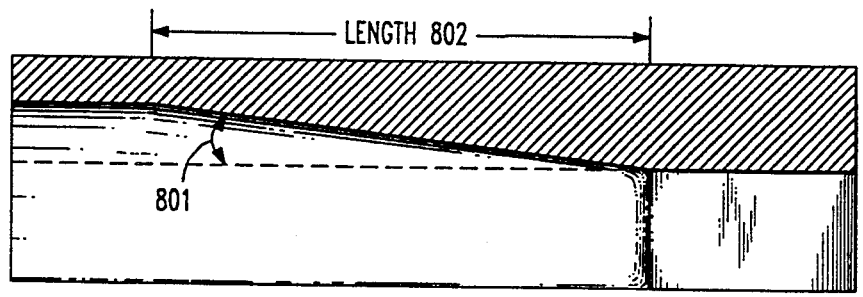
FIG. 9 SIDE VIEW OF SUBASSEMBLY 601
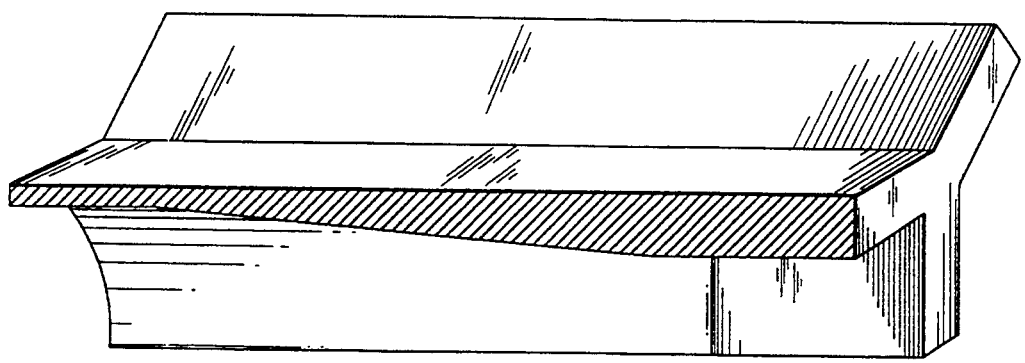

MOLD 1000

METHOD OF THERMOFORMING AN OPTICAL FIBER END

This application is a continuation of application Ser. No. 07/788,062, filed on Nov. 5, 1991, now abandoned, which is a division of application Ser. No. 07/590,974, filed on Oct. 1, 1990, now U.S. Pat. No. 5,153,932.

TECHNICAL FIELD

The present invention relates to the transmission of light in an optical system and, in particular, to an optical coupler used in such a system.

BACKGROUND OF THE INVENTION

In many optical local area networks (LANs) and optical backplanes that have a bus-type architecture, an optical repeater receives and combines optical signals from optical transmitters in system nodes, as well as amplifies and individually retransmits signals to optical receivers in the system nodes. FIG. 1 illustrates such a prior art optical transmission system. Nodes 106 through 110 transmit and receive optical signals to and from optical repeater 100 by way of optical fibers 130 through 139. Specifically, optical repeater 100 receives and combines optical signals via optical fibers 135 through 139 and redistributes these optical signals via optical fibers 130 through 134. Optical combiner 115 receives and combines the optical signals; whereupon components 116, 117, and 118 electrically process the combined signal. Optical unit 123 then converts the combined electrical signals to an optical signal and transfers it to optical splitter 124 via optical link 140 which communicates the optical signal on links 130 through 134. Nodes 106 through 110 are identical with each having a controller, receiver unit, transfer unit, and power control as illustrated for node 106. Optical combiners and splitters, such as units 115 and 116, are generically referred to herein as optical couplers.

FIG. 2 illustrates an optical coupler in accordance with U.S. Pat. No. 4,913,508 which performs the functions of couplers 115 and 124. The optical signals from optical fiber bundle 201 are coupled via optical coupler 203 to optical fiber 204. Similarly, an optical signal from optical fiber 204 may be coupled to optical fiber bundle 201. The cavity of optical coupler 203 forms the optical core of the optical coupler and is filled with a material that creates a waveguide with substantially the same numerical aperture as optical fiber 204 and optical fiber bundle 201. By matching the numerical apertures, the efficient transfer of optical energy is achieved between the: optical fibers in spite of possible refractive index mismatch between the optical core and optical fiber bundle 201 and optical fiber 204.

One of the problems of making optical couplers of the type illustrated in FIG. 2 is the packing density achieved using round fibers in optical fiber bundle 201. The theoretical efficiency for perfectly uniform illumination of optical fiber bundle 201 by optical fiber 204 is given by the total core area of optical fiber bundle 201 divided by the total cross-sectional area of the cavity of optical coupler 203. In general, the theoretical efficiency for perfectly uniform illumination is limited to the range of 50-60% for various numbers of fibers using the optical coupler illustrated in FIG. 2.

The disadvantage of utilizing round optical fibers in a round cavity is illustrated in FIG. 3 and 4. FIG. 3 illustrates the case where the diameter of the cavity of the optical coupler is equal to four times the diameter of optical fiber 204. FIG. 4 illustrates the case where the diameter of the cavity of the optical coupler is equal to eight times the diameter of optical fiber 204. As illustrated, the optical coupler of FIG. 3 has a theoretical efficiency of 49%; and the optical coupler of FIG. 4 has a theoretical efficiency of 59%. Further, for optical fibers having polymeric cladding and cores, the cladding cross-sectional area is extremely small compared to the interstitial space between bundled optical fibers. Thus the removal of the cladding is costly and difficult with only a tiny increase in efficiency that might be gained. In the coupler illustrated in FIG. 2, the numerical apertures of the fibers and the polymeric mixing region are closely matched and the reflection is extremely small. Hence, the inefficiency caused by the interstitial space between round fibers is the only significant source of inefficiencies in this type of coupler.

It is known in the an to mill optical glass preforms into D-shaped cross-sections and to draw D-shaped fibers from these preforms. These D-shaped optical fibers are then put together in circular cross-sections to make up 2 × 2 optical couplers. However, this method has the disadvantage of extremely high milling cost and material waste, since the entire optical fiber has to be in the D-shape. Similarly, other fiber shapes can be made by first milling an optical preform to form optical fibers but would suffer from the same disadvantages as the use of this method to form D-shaped optical fibers.

SUMMARY OF THE INVENTION

The aforementioned problem is solved and a technical advance is achieved in the an by reducing the interstitial space by using round optical fibers whose ends have been formed into a predefined shape to allow greater physical packing densities in order to achieve greater uniform illumination efficiency. Specifically, the interstitial space is greatly reduced in preferred embodiments by thermoforming the ends of round optical fibers in a mold with a cavity that makes a gradual transition along its length from a circular shape to the predefined shape to avoid optical loss. Since the change in shape is gradual during the reforming, the total cross-sectional area of the fibers remains constant; and optical loss is minimal because there is no reduction in mode volume. The predefined shape may advantageously be substantially square or rectangular. The core and cladding materials of the optical fiber are carefully chosen with respect to the glass transition temperatures of both materials because the temperature at which the materials are formed by the mold are slightly above the glass transition temperature of the core or cladding, whichever is higher. If the core material of an optical fiber has a semicrystalline structure, the optical fiber is formed at a temperature near the melting temperature of the core material. Similarly, if the cladding is of sufficient thickness and is of a material having a semicrystalline structure with the core having a non-semicrystalline structure, the optical fiber is formed at a temperature near the melting temperature of the cladding material.

The mold is capable of being used in field applications, allowing the optical fibers to be terminated in the field without difficulty. In one embodiment in accordance with the invention, the cladding material and the core material of the thermoformed optical fibers are a fluorinated acrylic polymer and poly(methyl methacrylate), respectively.

Other and further aspects of the present invention will be become apparent during the course of the following description and by reference to the accompanying drawing.

BRIEF DESCRIPTION OF THE DRAWING

Referring now to the drawing:

FIGS. 6 through 9 illustrate a mold for forming the end of an optical fiber into a substantially square shape.

DETAILED DESCRIPTION

Figure 1:
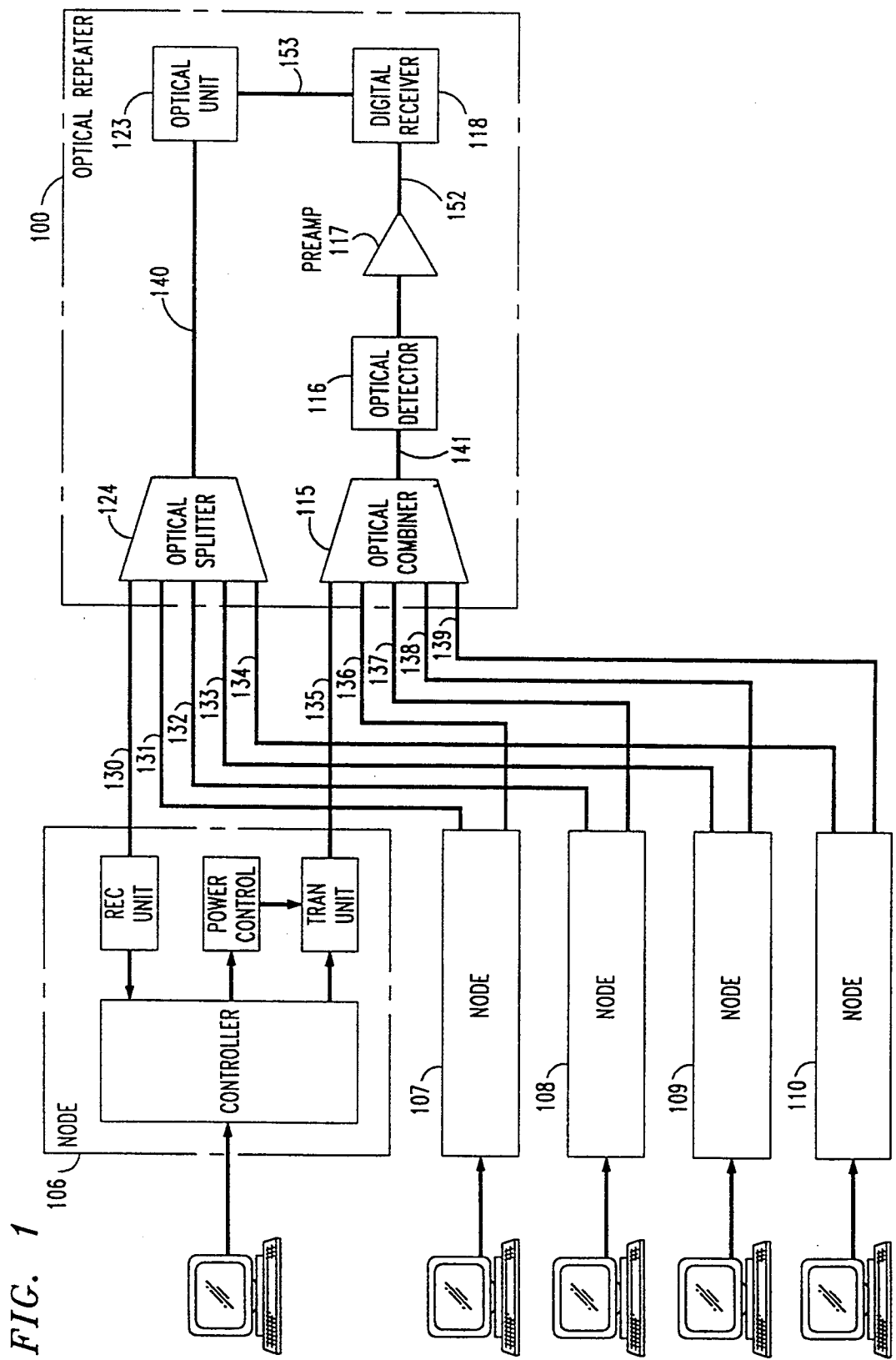
FIG. 1 illustrates a prior art optical transmission system.
Figure 2:
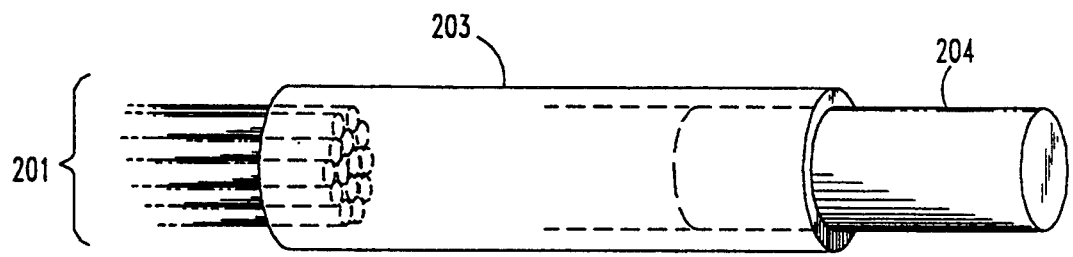
FIG. 2 illustrates a prior art optical coupler.
Figure 3:
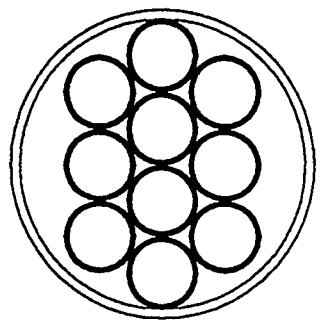
FIGS. 3 and 4 illustrate arrangements of optical fibers in a prior art optical coupler.
Figure 4:
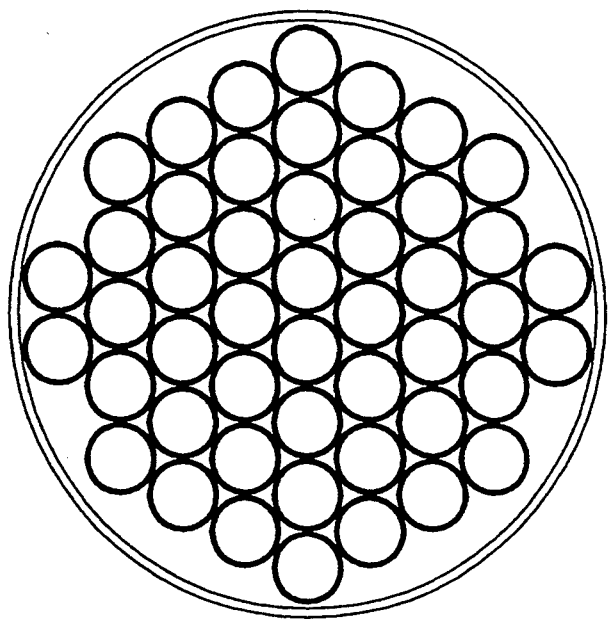
Figure 5:
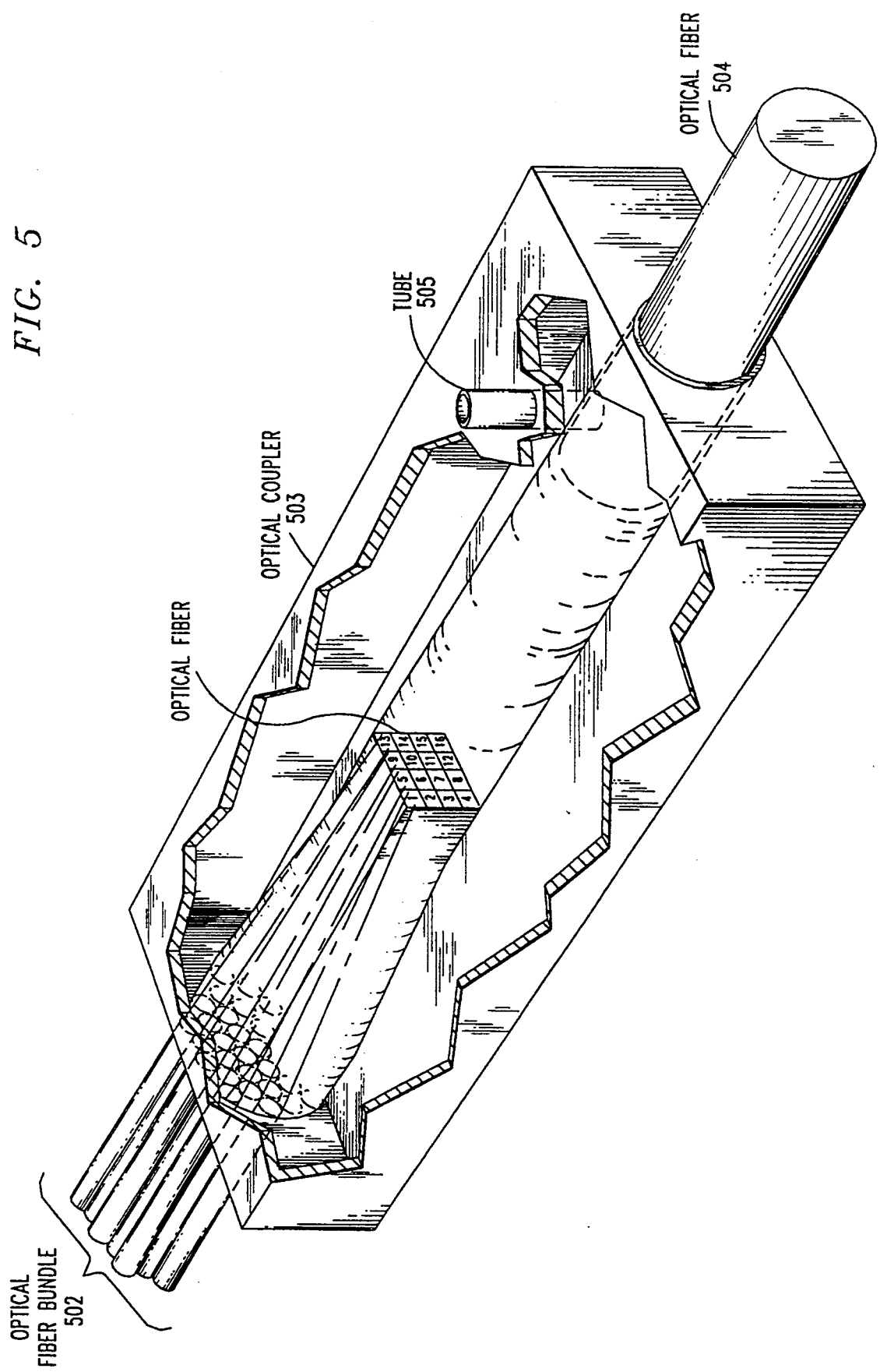
FIG. 5 illustrates an optical coupler in accordance with the present invention.

FIG. 5 illustrates an optical coupler for communicating optical signals between optical fiber bundle 502 and optical fiber 504. In accordance with the invention, the end of each fiber of optical fiber bundle 502 has been formed — illustratively thermoformed — to have advantageously a substantially square end and to concomitantly minimize the amount of interstitial space between each optical fiber 1 through 16 of optical fiber bundle 502 when inserted into optical coupler 503. Fabrication of optical coupler 503 with optical fiber bundle 502 and optical fiber 504 is performed by first inserting optical bundle 502 and optical fiber 504 into optical coupler 503. After the insertion of optical fiber bundle 502 and optical fiber 504, the cavity of optical coupler 503 is filled via tube 505 with an optical medium which creates a waveguide having substantially the same numerical aperture of optical fiber 504 and optical fiber bundle 502. Details on the type of optical medium, the preparation, and insertion of this optical medium via tube 504 are given in U.S. Pat. No. 4,913,508, which is hereby incorporated by reference.

Consider how each optical fiber of optical fiber bundle 502 is thermoformed to have substantially a square shaped end. Advantageously, the glass transition temperatures for the core and cladding materials of the optical fiber are similar because the temperature at which the materials are formed is slightly above the glass transition temperatures of the core or cladding, whichever is higher. Advantageously, one material system providing the desired characteristics is a poly(methyl methacrylate) core material and a fluorinated acrylic polymer cladding material. This material system provides a temperature range for molding purposes of approximately 100° C. to 150° C. One skilled in the art could readily utilize other materials for the cladding and core which would have the desired glass transition temperatures.

If the core material of the optical fiber has a semicrystalline structure, the optical fiber is formed at a temperature near the melting temperature of the core material. In addition, if the cladding is of sufficient thickness and is of a material having a semicrystalline structure and the core has a non-semicrystalline structure, the optical fiber is formed at a temperature near the melting temperature of the cladding material. One example of such a cladding material is poly(4-methyl pentene-1) which is commercial used with a polycarbonate core material. The melting temperature of poly(4-methyl pentene-1) is 245° C.

FIG. 6 illustrates a front view of mold 600 for forming the end of optical fiber 603 into a substantially square shape as illustrated in FIG. 7. Optical fiber 603 represents one of the optical fibers of optical fiber bundle 502. Optical fiber 603 is placed in contact with subassembly 602, and subassembly 601 is positioned as illustrated in FIG. 6. Heating elements 604 and 605 heat subassemblies 601 and 602, respectively, to approximately 125° C. for a sufficient amount of time to bring both the cladding and core of optical fiber 603 to a temperature above their glass transition temperatures. After this temperature is achieved throughout optical fiber 603, subassembly 601 is moved to the position illustrated in FIG. 7 resulting in the end of optical fiber 603 becoming substantially square.

FIG. 8 illustrates a side view of subassembly 602, and FIG. 9 illustrates a top view of subassembly 602. Angle 801 defines the transition from a round fiber to a substantially square fiber. Angle 801 is defined by the following formula:

$$\theta = \tan^{-1}\left(\frac{R - \frac{1}{2}\sqrt{\pi}\, R^2}{L}\right)$$

where L is length 802 of FIG. 8 which is the length of the transitional portion of subassemblies 601 and 602. To minimize modal loss, the length 802 is chosen to be at least 20 fiber diameters. R is the radius of optical fiber 603. Subassembly 601 is similar in shape to subassembly 602.

Figure 10:
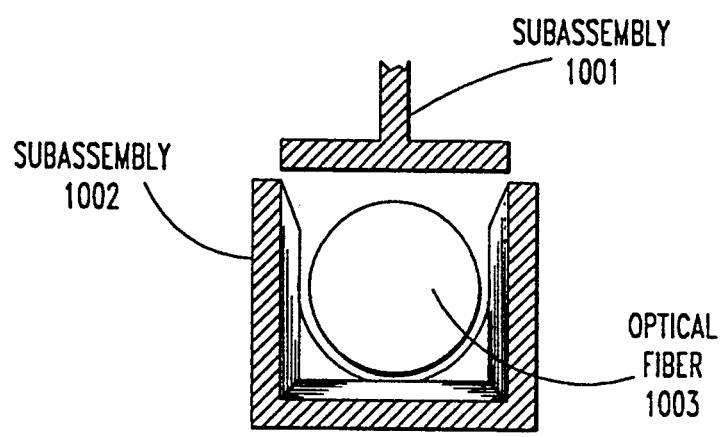
FIGS. 10 and 11 illustrate a mold for forming the end of optical fiber into a substantially rectangular shape.
Figure 11:
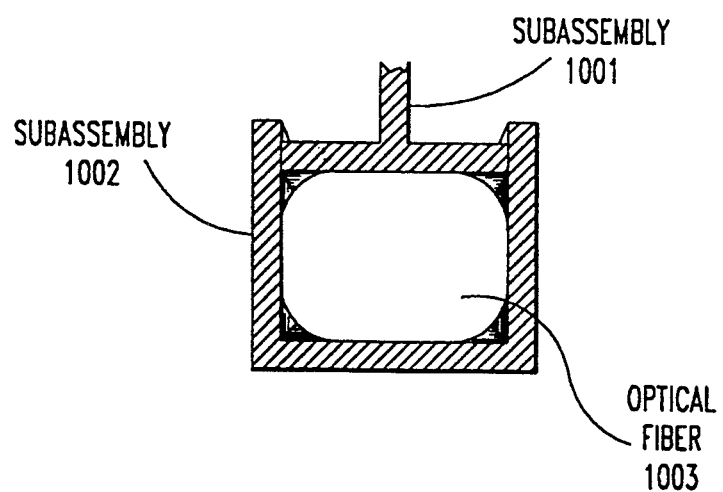

Advantageously, it may be desirable to be able to produce substantially rectangular shaped ends of optical fibers in addition to substantially square shaped ends. FIG. 10 illustrates mold 1000 that produces substantially rectangular ends. First, optical fiber 1003 is placed in subassembly 1002, and subassembly 1001 is then brought into contact with optical fiber 1003. Subassemblies 1001 and 1002 are then heated to approximately 125° C. Once optical fiber 1003 has reached a temperature above the glass transition temperatures of the cladding and core, subassembly 1001 is moved to the position illustrated in FIG. 11.

It is to be understood that the above-described embodiments are merely illustrative of principles of the invention and that other arrangements may be devised by those skilled in the art without departing from the spirit or scope of the invention. In particular, other molds may be readily devised by those skilled in the art; and in particular different shapes may be utilized for the ends of the optical fibers. In addition, other material systems for the cladding and core materials may be readily devised by those skilled in the art.

We claim:

1. A method for thermoforming a length of an optical fiber having a first shape, the optical fiber having a cladding material and a core material, said method comprising:

heating said optical fiber; and placing the heated optical fiber in a mold with a cavity that makes a gradual transition along its length from said first shape to a second shape and gradually reforming said length of said optical fiber form the end of said optical fiber from said first shape to said second shape in the mold so as to maintain the cross-sectional area of said optical fiber constant thereby maintaining the optical mode volume of said optical fiber to reduce optical loss.

2. The method of claim 1 wherein said optical fiber is heated to a temperature above the glass transition temperatures of said cladding and core materials of said optical fiber.

3. The method of claim 2 wherein said cladding material is a fluorinated acrylic polymer and said core material is poly(methyl methacrylate).

4. The method of claim 2 wherein said first shape is round and said second shape is square.

5. The method of claim 2 wherein said first shape is round and said second shape is rectangular.

* * * * *